Figure 1:
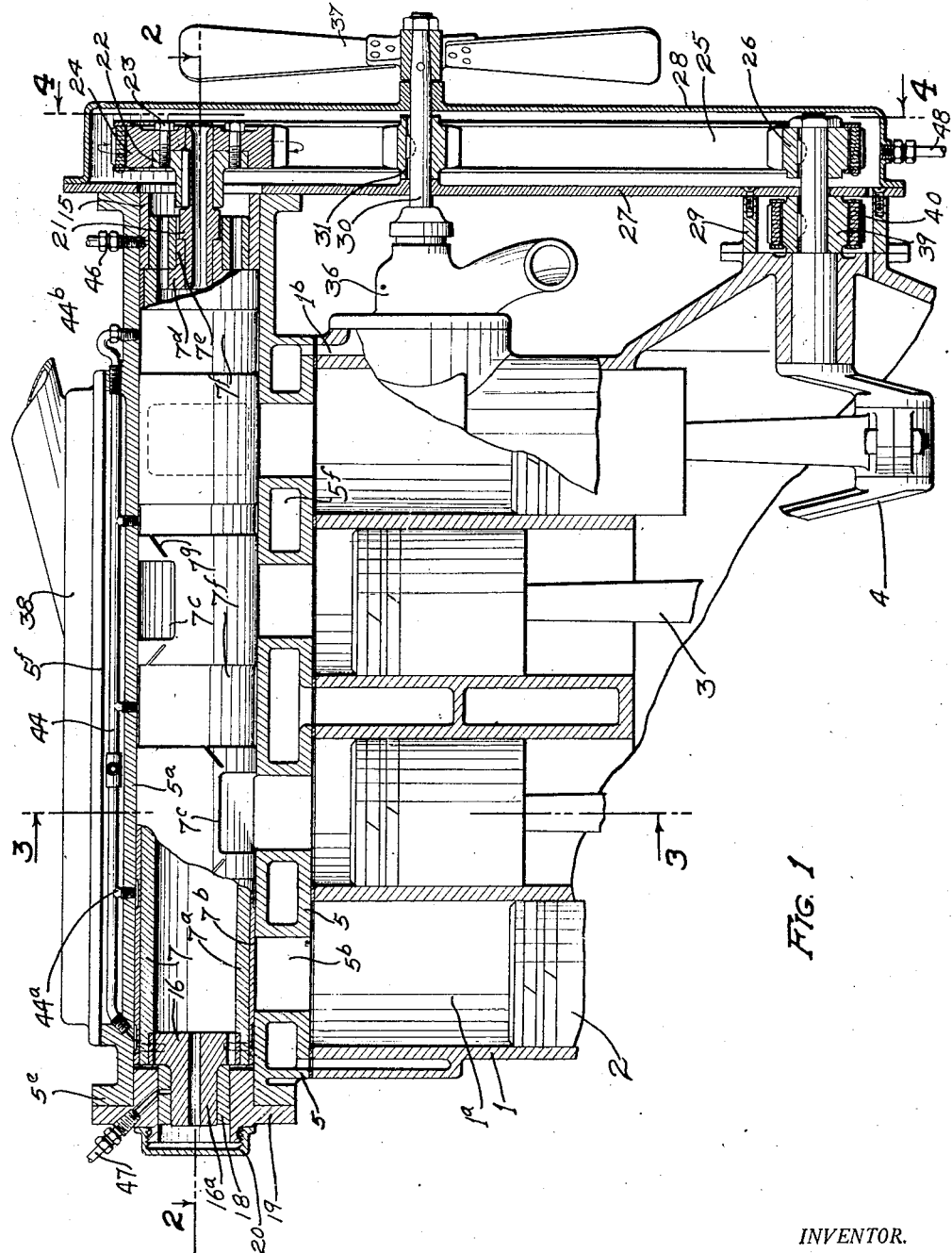

INVENTOR.
EDWARD W. JEWELL
BY A.B.Bowman
ATTORNEY

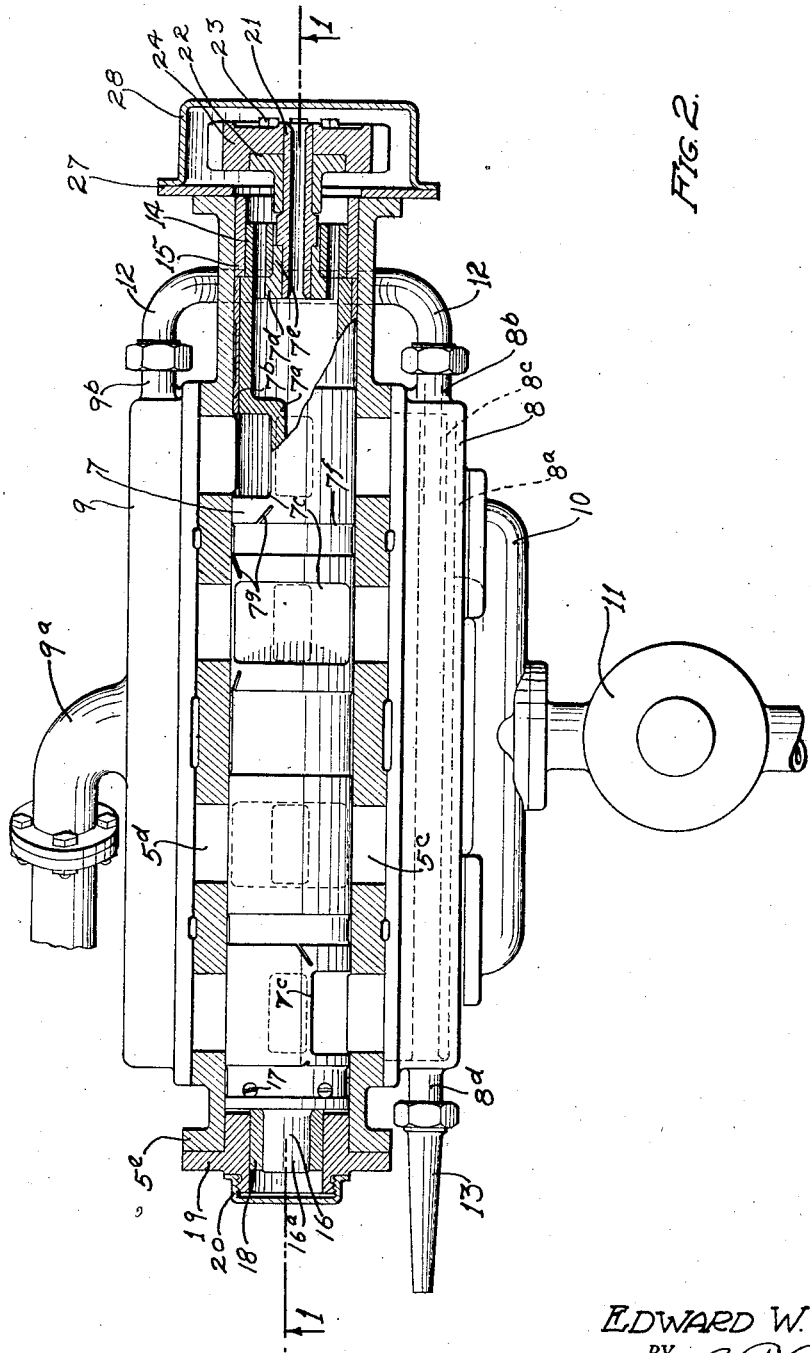

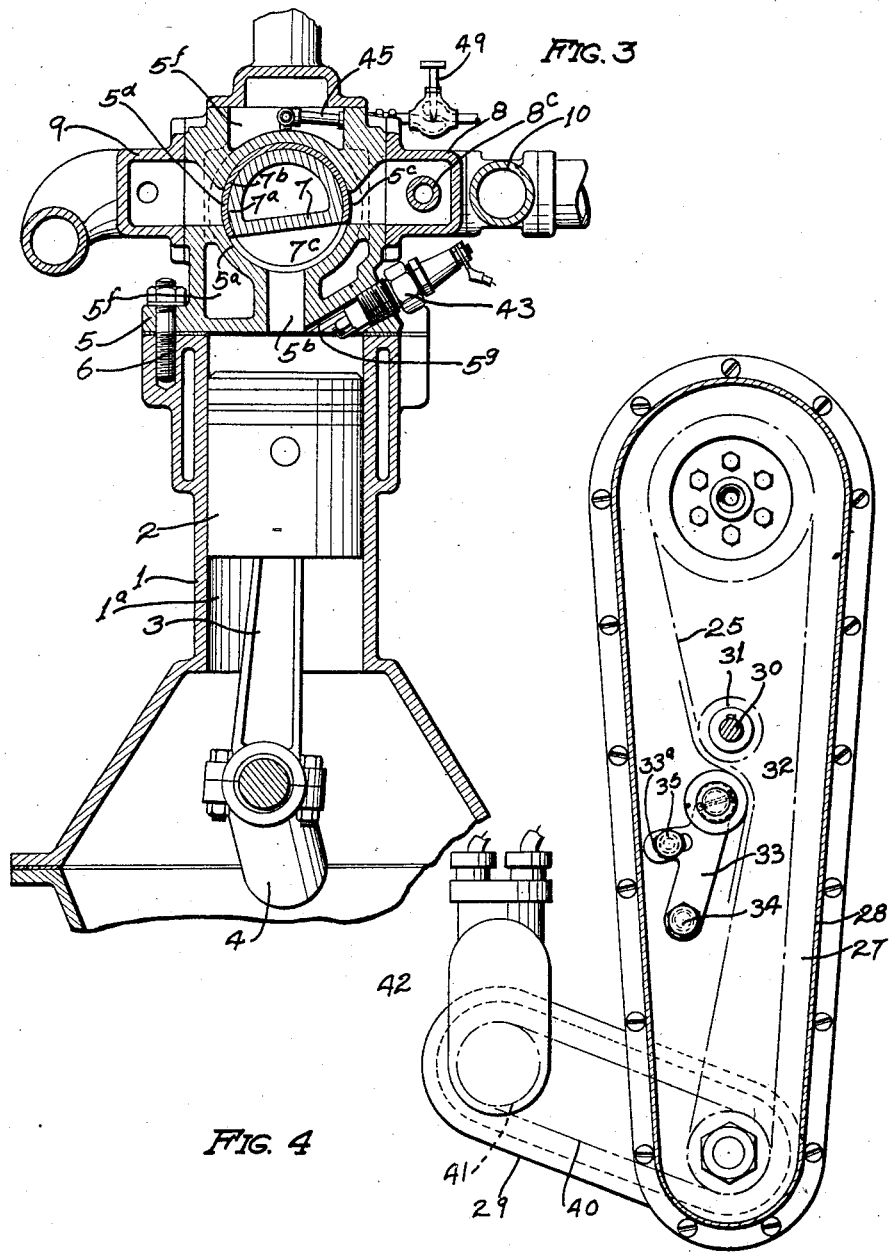

Patented Nov. 22, 1927.

1,650,362

UNITED STATES PATENT OFFICE.

EDWARD W. JEWELL, OF SAN DIEGO, CALIFORNIA.

ROTARY-VALVE-TYPE INTERNAL-COMBUSTION ENGINE.

Application filed April 12, 1926. Serial No. 101,342.

My invention relates to internal combustion engines, particularly to the rotary valve type of internal combustion engines.

The objects of my invention are: First, to provide an internal combustion engine having a rotary cylinder valve revolubly mounted at its opposite ends at the head end of the engine, whereby the valve portions intermediate the ends of the valve are fully floating in a cylindrical barrel at the head end of the engine so that friction of the valve against the wall of the cylindrical barrel, due to the explosion of the gases in the several cylinders or due to the compression of the gases therein, will be reduced to a minimum, and whereby even lubrication is permitted at all times between the adjacent surfaces of the valve and the cylindrical valve barrel; second, to provide an internal combustion engine of this class in which the rotary valve and the housing therefor are provided with large gas passages which cannot be readily clogged with carbon and which permit free passage of the fuel and exhaust gases at all times, permitting the exhaust gas passages to be kept cool, and therefore providing for effective cooling of the whole valve structure, and in general preventing overheating of the motor and providing for high efficiency of the same; third, to provide a rotary valve for internal combustion engines in which the outer or peripheral portion of the valve is provided with a hardened steel shell shrunk over a hollow cylindrical valve member, whereby friction is further reduced to a minimum and whereby wear of the outer engaging surface of the valve member is reduced to a minimum; fourth, to provide a novel oiling system for an internal combustion engine of this class, whereby the rotary valve is efficiently oiled under all conditions; fifth, to provide an internal combustion engine of this class in which the lubricating oil applied at the ends of the peripheral portion of the rotary valve and at the bearings at the ends of the valve is returned to the crankcase of the engine or any other suitable oil reservoir thereof; sixth, to provide an internal combustion engine of this class which is so constructed that the rotary valve may be easily removed from one end of the valve barrel for inspection or replacement without dismounting any material portion of the engine; seventh, to provide an engine of this class having a hollow rotary valve, which valve is so constructed and so mounted at the head end of the engine that exhaust gases escaping between the adjacent surfaces of the valve and the containing barrel are forced into one end of the valve, through the same and out at the other end into the crankcase; eighth, to provide a novel water-cooled, rotary valve housing for an engine of this class whereby the rotary valve may be effectively cooled and whereby the lubricating oil between the adjacent surfaces of the valve and its housing disintegrates and forms a carbon coating between said surfaces; ninth, to provide a rotary valve containing head for an internal combustion engine of this class in which spark plugs are secured in the head from the side and at an angle so that the spark is in close proximity to the combustible charge in the cylinders but in which the points of the plugs are protected from carbonization and oil from the valve; tenth, to provide a novel chain drive mechanism in an engine of this class for driving a rotary valve from the crankshaft of the engine and simultaneously driving the water pump and cooling fan; eleventh, to provide novelly constructed fuel intake and exhaust manifolds for a rotary valve type internal combustion engine in which a portion of the exhaust gases is passed through the intake manifold for heating the fuel gases passing through the same; twelfth, to provide an intake manifold of this class whereby the exhaust gas carrying conductor passing through the same facilitates the mixing of the fuel gases and the distribution of the same to the several fuel intake ports in the valve head and to the ports in the valve; thirteenth, to provide as a whole a novelly constructed rotary valve type internal combustion engine, and fourteenth, to provide an engine of this class which is particularly simple and economical of construction, one having relatively few moving parts, which is durable, highly efficient, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a fragmentary longitudinal sectional elevational view of my rotary valve type internal combustion engine in its preferred form of construction, with the view taken through 1—1 of Fig. 2; Fig. 2 is a longitudinal sectional view thereof in plan, taken through 2—2 of Fig. 1, showing certain parts and portions in plan and others broken away and in section to facilitate the illustration; Fig. 3 is a fragmentary transverse sectional elevational view thereof, taken through 3—3 of Fig. 1, and Fig. 4 is a sectional elevational view thereof, taken through 4—4 of Fig. 1.

Like characters of reference refer to similar parts and portions throughout the several views of the drawings.

The engine block 1, shown in the drawings, is the same for all intents and purposes, as those now employed in conventional internal combustion engine construction, and is provided with a plurality of cylinders $1^a$ in line, in which cylinders are reciprocally mounted pistons 2, which are connected, by means of connecting rods 3, with a multiple-throw crankshaft 4 revolubly mounted at the lower end of the engine block 1.

On the upper face or head end of the block 1 is mounted the valve head or housing 5, which is secured to the block 1 by means of studs or bolts 6. Extending longitudinally through and positioned substantially centrally in the valve housing is a cylindrical rotary valve bore or barrel $5^a$ in which is revolubly mounted a cylindrical rotary valve 7. The bore or barrel $5^a$ communicates with each cylinder $1^a$ of the engine block by means of large vertical ports or passages $5^b$, which are elongated and extend longitudinally with the axis of the bore $5^a$. The valve 7 is preferably made of a hollow cast, cylindrical member $7^a$ of smaller external diameter than the bore $5^a$ of the valve head and is provided at its outer portion with a relatively thin steel shell $7^b$, which is preferably shrunk around the member $7^a$ and is hardened and ground at its peripheral surface. The valve 7 is provided with a plurality of wide and deep, transverse passages or channels $7^c$, which extend into the members $7^a$ and $7^b$ to substantially the center, the inner or bottom walls of said channels being preferably straight. One of said channels is provided for each engine cylinder and is adapted to register with the port or passage $5^b$ in the valve head. At the opposite lateral sides of the valve head or housing 5 are provided fuel intake and exhaust ports or passages $5^c$ and $5^d$, respectively, a pair of such ports or passages being provided for each cylinder of the engine block and so positioned as to register with the channels $7^c$ of the valve. Said ports or passages $5^c$ and $5^d$ extend longitudinally with the axis of the valve and diverge outwardly to a large extent to the lateral faces of the valve housing, as shown best in Fig. 3. At the opposite side faces of the valve housing are secured the fuel intake and exhaust manifolds 8 and 9 of long continuous and similar construction, the former being secured over the passages $5^c$ and the latter over the passages $5^d$ of the valve housing. The intake manifold 8 is provided at its outer side and near its ends with a pair of fuel intake and distributing openings $8^a$ over which are secured the open ends of the primary distributing manifold 10 intermediate the ends of the outer side of which is secured a suitable carbureter 11. Intermediate the ends of the exhaust manifold 9 is provided an exhaust discharge portion or passage $9^a$, which may be connected to a suitable muffler, not shown. At the forward end of the exhaust manifold 9 is provided a somewhat smaller exhaust discharge portion or passage $9^b$, which is connected, by means of a conductor 12 extending underneath the forward end of the valve housing, to a similar forwardly extending portion $8^b$ of the fuel intake and distributing manifold 8. Extending longitudinally through the intake manifold 8 and spaced from the side walls thereof is an exhaust gas conductor $8^c$, shown best in Fig. 3, which conductor communicates with the portion $8^b$ and the conductor 12 at its forward end and with a similar portion $8^d$ at its rear end. To the hollow portion $8^d$ is preferably connected a reducing or backwardly tapering tube or nozzle 13, which permits the exhaust gases passing through the intake manifold to be discharged to the atmosphere as a cool gas. The tendency of the member 13, which extends backwardly, is also to facilitate the drawing of exhaust gases through the conductor in the intake manifold.

The forward end of the valve is provided with a head $7^d$, which has a forwardly extending, hollow boss $7^e$ on which is driven a longitudinally perforated steel bearing bushing 14, which is revolubly mounted in a bronze bushing 15 mounted in the forward end of the bore of the valve housing. This bronze bushing is engaged by and positions the forward end of the valve.

In the rear end of the valve is secured a hardened steel head member 16 in the form of a plug, which is secured in position by means of screws 17, as shown best in Fig. 2. This head member is provided with a hollow, backwardly extending boss $16^a$, which is revolubly mounted in a bronze bushing 18 driven into the central portion of a removable head member 19 having an annular flange adapted to be secured to a similar flange $5^e$ at the rear end of the valve housing. Said bronze bushing longitudinally positions the rear end of the valve. Over the rear end of the member 19 is screwably secured a cap 20.

Into the hollow boss 7$^e$ is driven a hollow stub shaft 21 on the forward end of which is driven and keyed a flange member 22 to which is secured, by means of bolts or screws 23, a silent chain sprocket 24. This sprocket 24 is connected, by means of a chain 25, with a sprocket 26 secured to the forward end of the crankshaft 4, the latter sprocket being one-half the diameter of the sprocket 24. Said sprockets and chain are encased in a casing consisting of a plate 27 and a cover 28, the latter being removably secured to the former, and the former being secured at its upper end to a flanged portion at the forward end of the valve housing and at its lower end to the forward side of a housing 29 secured to the forward end of the engine block and the crankcase.

In order to remove the valve from the valve housing, the cover 28 is removed and the chain 25 removed from the sprocket 24, which permits the bushing 15, together with the valve, to be drawn through the forward end of the valve housing.

Intermediate the ends of the plate 27 and the cover 28 is revolubly mounted a shaft 30, which extends transversely through said members. On said shaft is secured a sprocket 31, which is driven by the chain 25. Said chain 25 is held in engagement with the sprocket 31 by means of a roller 32 revolubly mounted at the one end of a chain-tightening arm 33, which is pivotally mounted at its opposite end on a shoulder screw 34 secured to the plate 27. The roller 32 is held against the chain by means of a bolt 35 extending through an arcuate slot 33$^a$ in a laterally extended arm of the member 33, as shown in Fig. 4. To the rearwardly extended end of the shaft 30 is secured the revoluble member of the water pump 36, which is secured over an opening in the water jacket portion at the forward end of the cylinder block in any suitable manner. To the forwardly extended end of the shaft 30 is secured the cooling fan 37 of any suitable construction.

The water jacket 1$^b$ surrounding the outer portions of the engine cylinders communicates, in any suitable manner, with the water jacket or chamber 5$^f$, which surrounds the various passages and bore of the valve housing. Over the upper face of the valve housing is secured the cooling water manifold 38, which communicates freely with the water jacket of the valve housing and conducts the water therefrom to a suitable cooling means or radiator, not shown.

To the forward end of the crankshaft 4 is secured another sprocket 39, which is positioned within the housing 29. At the opposite end of the housing 29 is mounted another sprocket 41, which is driven from the sprocket 39 by means of a chain 40. The sprocket 41 is adapted to drive the distributing mechanism of the ignition system of the engine, as well as the electric generator and oil pump, not shown.

In the side of the valve housing are provided spark plug openings 5$^g$ in which are secured the spark plugs 43. The openings 5$^g$ extend into the valve housing at an angle and communicate at their lower ends with the combustion chambers of the cylinders, the angularity of the openings 5$^g$ being such as to prevent oil from the valve 7 from fouling the points of the plugs.

In the water chamber of the valve housing and above the wall forming the cylindrical valve barrel is provided an oil conductor 44, which is connected, by means of a conductor 45 intermediate its ends, through the side wall of the valve housing by means of suitable fittings, with the oil pump of the engine, not shown. In the upper portion of the wall forming the valve barrel of the valve housing is secured a plurality of plugs 44$^a$, which are connected, preferably by welding or brazing, to the conductor 44 for supplying oil under pressure to an equal number of annular grooves 7$^f$ spaced longitudinally around the periphery of the valve between the several transverse gas passages 7$^c$ therein and between said passages and the ends of said valve, as shown in Figs. 1 and 2. Said annular grooves or channels 7$^f$ extend within short distances of the several gas passages. These oil grooves 7$^f$ are provided with small angularly positioned oil grooves 7$^g$, which extend toward, but spaced at their ends from the gas passages to permit oil to be fed to all essential portions of the rotating valve and its containing barrel. The angularity of the grooves 7$^g$ is such that the oil will automatically feed, by reason of the rotation of the valve, toward the gas passages. In the oil conductor 45, outside of the valve housing, is provided a needle valve 49, as shown in Fig. 3, to permit oil to be conducted in regulated quantities and at various pressures to the grooves in the valve so as to provide lubrication for the valves as desired.

By reason of the particular construction of the valve housing, one of the oil grooves 7$^f$ is positioned outside of the longitudinal extent of its water jacket; therefore, the oil conductor 44 is extended beyond the forward end of the upwardly extending portion of the water jacket and is connected by means of a tube 44$^b$ with a plug extending through the wall of the valve and communicating with the foremost oil groove 7$^f$.

The forward bearing for the valve is lubricated by an oil conductor 46 communicating with the bearing surface between the bronze bushing 15 and steel bushing 14 through an orifice in the bronze bushing. The rear bearing is oiled from an oil conductor 47 extending through the removable head member 19, which supplies oil through an orifice in the bronze bushing to the bearing, as shown in Fig. 1.

The oil passing beyond the rear end of the valve will pass through perforations in the flange portion of the head member 16 into the interior of the valve. Oil passing beyond the rear end of the rear bearing will pass into the interior of the valve through the hollow boss of the head member 16. The excess oil is thus passed from the rear to the forward end of the valve and passes through perforations in the head 7ᵈ, which aline with similar perforations in the forward steel bearing bushing. The oil is then returned through the sprocket and chain casing to the crankcase of the engine or other suitable reservoir by means of a conductor or opening at the lower end of said casing.

Though I have shown and described a particular construction, combination and arrangement of parts and portions. I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In an internal combustion engine, a cylinder having a water jacket head at its one end, said head being provided with a valve bore, a valve revolubly mounted within said bore and provided with a transversely extending passage in its side wall for connecting the cylinder with a source of fuel, and an oil conductor connected with a source of oil under pressure and positioned within the water chamber of said head and communicating with said bore, said valve having annular oil conducting channels at the opposite sides of said transversely extending passages therein, said oil channels being adapted to receive oil from said oil conductor.

2. In an internal combustion engine, a cylinder having a water jacket head at its one end, said head being provided with a valve bore, a valve revolubly mounted within said bore and provided with a transversely extending passage in its side wall for connecting the cylinder with a source of fuel, and an oil conductor connected with a source of oil under pressure and positioned within the water chamber of said head and communicating with said bore, said valve having annular oil conducting channels at the opposite sides of said transversely extending passage therein, said oil channels being adapted to receive oil from said oil conductor, the peripheral surface of said valve being provided with angularly extending oil grooves communicating with the oil channels therein and adapted to conduct oil toward said transverse passages when said valve is in rotation.

3. In an internal combustion engine, a plurality of cylinders, a valve housing mounted over the one end of said cylinders, said housing having a longitudinal bore therein and sets of ports for each cylinder extending from said bore, a cylinder valve revolubly mounted at its ends in said bore, a flange member secured to the one end of said valve, said flange member being of sufficiently small diameter to permit the valve to be withdrawn from said valve housing, a drive member secured to said flange member, and a bearing member secured to the valve housing in its bore at the end thereof opposite the drive member of the valve, said bearing member revolubly supporting the opposite end of said valve.

4. In an internal combustion engine, a cylinder having a head at its one end, said head being provided with a valve bore, a hollow cylinder valve revolubly mounted within said bore and provided with openings in its opposite ends, means for supplying oil under pressure to the peripheral surface of said valve, the excess oil from one end of said valve being adapted to pass through the same to the opposite end thereof, and means for conducting excess oil from said opposite end to a reservoir.

In testimony whereof, I have hereunto set my hand at San Diego, California, this 7th day of April, 1926.

EDWARD W. JEWELL.